US011674310B2

(12) United States Patent
Priestman

(10) Patent No.: US 11,674,310 B2
(45) Date of Patent: Jun. 13, 2023

(54) RELOCATABLE INTERNAL WALL PANEL, KIT AND SYSTEM

(71) Applicant: Priestman Goode Limited, London (GB)

(72) Inventor: Paul Priestman, London (GB)

( * ) Notice: Subject to any disclaimer, the term of this patent is extended or adjusted under 35 U.S.C. 154(b) by 99 days.

(21) Appl. No.: 17/150,116

(22) Filed: Jan. 15, 2021

(65) Prior Publication Data
US 2021/0222430 A1 Jul. 22, 2021

(30) Foreign Application Priority Data

Jan. 16, 2020 (HK) .......................... 32020001567.7

(51) Int. Cl.
*E04B 2/82* (2006.01)
*E04B 2/74* (2006.01)
*F16H 19/04* (2006.01)

(52) U.S. Cl.
CPC ............ *E04B 2/827* (2013.01); *E04B 2/7405* (2013.01); *E04B 2/7448* (2013.01); *E04B 2/824* (2013.01); *F16H 19/04* (2013.01); *E04B 2002/7488* (2013.01)

(58) Field of Classification Search
CPC ..... E04H 1/125; E04H 1/1255; E04H 1/1261; E04H 1/1266; E04H 1/1272; E04H 1/005; E04H 1/02; E04H 1/12; E04H 1/1205; E04H 1/1211; E04H 1/1222; E04H 1/1227; E04H 1/1244; E04B 2/824; E04B 2/7405; E04B 2/7448; E04B 2/7453; E04B 2/7457; E04B 2/7459; E04B 2/72; E04B 2/74; E04B 2/7401; E04B 2/7407; E04B 2/7422; E04B 2/7425; E04B 2/827; E04B 2/825; E04B 2/821; E04B 2002/749; E04B 2002/7492; F16H 19/04
See application file for complete search history.

(56) References Cited

U.S. PATENT DOCUMENTS

| | | | | |
|---|---|---|---|---|
| 3,033,330 A | * | 5/1962 | Fowles | E04B 2/825 52/476 |
| 3,650,556 A | * | 3/1972 | Ratcliff | B60P 3/34 296/171 |
| 4,103,463 A | | 8/1978 | Dixon | |
| 4,454,690 A | * | 6/1984 | Dixon | E04B 2/824 52/126.3 |
| 5,038,534 A | * | 8/1991 | Pollock | E04B 2/7451 52/241 |

(Continued)

FOREIGN PATENT DOCUMENTS

| | | |
|---|---|---|
| CN | 1232518 A | 10/1999 |
| CN | 201443147 U | 4/2010 |

(Continued)

*Primary Examiner* — Jessica L Laux
(74) *Attorney, Agent, or Firm* — Owens Law Firm, PC

(57) ABSTRACT

There is disclosed a relocatable internal wall panel, kit and system for a room having a floor and ceiling. The wall panel comprises a first wall portion and a second wall portion having opposed planar surfaces to define a void. The first wall portion is at least partly received within the void defined within the second wall portion in a retracted position and reversibly extendable therefrom such that in the extended position the upper edge of the first wall portion bears against the ceiling of the room.

8 Claims, 22 Drawing Sheets

(56) References Cited

U.S. PATENT DOCUMENTS

| | | | | |
|---|---|---|---|---|
| 5,042,555 A | * | 8/1991 | Owens | E04B 2/827 |
| | | | | 160/40 |
| 6,023,896 A | | 2/2000 | Rothschild | |
| 10,697,193 B2 | * | 6/2020 | Tafuro | E06B 3/486 |
| 10,842,266 B2 | * | 11/2020 | Matthai | A47B 41/02 |

FOREIGN PATENT DOCUMENTS

| | | |
|---|---|---|
| CN | 205849168 U | 1/2017 |
| CN | 107975162 A | 5/2018 |
| CN | 209686659 U | 11/2019 |
| CN | 209941972 U | 1/2020 |
| JP | 06306975 A | 11/1994 |
| KR | 20020003801 A | 1/2002 |
| KR | 101257195 B1 | 4/2013 |

\* cited by examiner

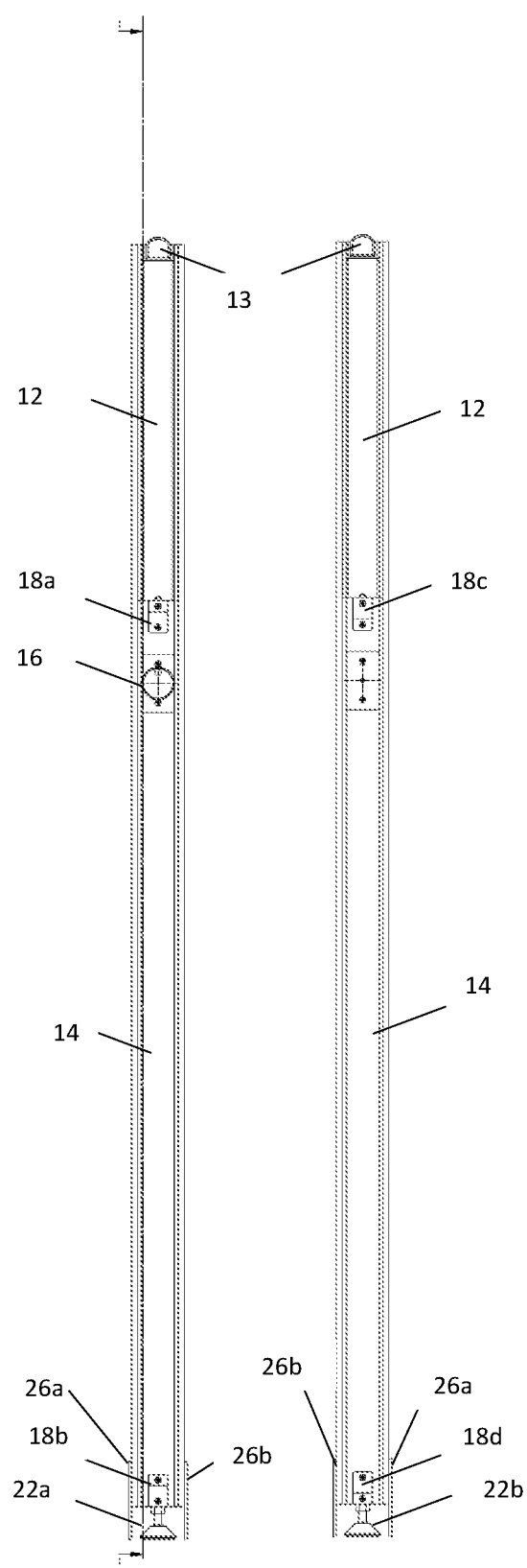

83a

83b

RELOCATABLE INTERNAL WALL PANEL, KIT AND SYSTEM

BACKGROUND OF THE INVENTION

Field

The present disclosure relates to a relocatable internal wall panel, kit and system for partitioning a room into separate spaces which can be installed and removed easily.

Background

Office buildings and residential apartments in large complexes are typically built with relatively standard layout and fixed internal walls which divide floors of the buildings/apartments into independent habitable spaces for work and/or living. Fixed internal walls are typically constructed within such apartments or floors using standard framing timber to which plasterboard or dry wall sheets are affixed.

However, once constructed such fixed walls are inconvenient or difficult to re-arrange if there is a need to change the internal configuration of such walls, as skilled tradespersons are required and typically result in dust, noise and inconvenience during any period of adjustment.

Alternatively, where the configuration of an internal space within an office or residential environment may need to be flexible, a track based system may be provided with wall panels being received in tracks formed in the ceiling and/or floor. The position of such wall panels may be changed to separate rooms into desired configurations. In some arrangements, the wall panels may be stackable in a folding concertina or accordion structure at the side or back of the room to facilitate storage when not deployed.

However, it would be appreciated that having such track based systems often require installation of track systems in either or both the ceiling and floor, and may be unsightly and tend to limit the flexibility of internal room configuration(s) available. Furthermore, the wall elements used in such systems must be sized appropriately to span between the floor and the ceiling.

A relocatable, temporary wall system that at least addresses some of the disadvantages of the above solutions or provides a potential choice is therefore desirable.

BRIEF SUMMARY OF THE INVENTION

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a relocatable internal wall panel for a room having a floor and ceiling. The wall panel may comprise a first wall portion; and a second wall portion comprising opposed planar surfaces defining a void therebetween. The first wall portion may be at least partly received within the void defined within the second wall portion in a retracted position and reversibly extendable therefrom such that in the extended position the upper edge of the first wall portion bears against the ceiling of the room.

Optionally, the upper edge of the first wall portion may include a resiliently compressible abutment member. The lower edge of the second wall portion may have a plurality of foot members for supporting the second wall portion on the floor concealed by a panel which defines a cable receiving space therein.

At least one toothed rack member may be affixed along at least one side of the first wall portion and at least one corresponding meshing gear is mounted on the second wall portion. The at least one corresponding meshing gear is coupled to a rotatable shaft for urging the at least one rack member and the first wall portion from out of the void of the second wall portion to an extended position. The at least one corresponding gear may be configured for coupling to the shaft of a rotary hand tool or powered tool.

The relocatable internal wall panel may further include adjacent coupling members reversibly engageable with corresponding coupling members of adjacent relocatable internal wall panels. The coupling members may be disposed on the lateral edges of the second wall portion between the opposed planar surfaces.

In accordance with a second aspect of the present disclosure, there is provided a relocatable internal wall system for a room having a floor and a ceiling. The system may comprise a plurality of relocatable internal wall panels according to the first aspect which are engageable with adjacent wall panel(s).

In accordance with a second aspect of the present disclosure, there is provided a relocatable internal wall panel kit. The kit may comprise a first wall portion; a second wall portion comprising opposed planar surfaces defining a void therebetween. The first wall portion may be configured to be at least partly received within the void defined within the second wall portion in a retracted position and reversibly extendable therefrom such that in the extended position the upper edge of the first wall portion bears against a ceiling of a room.

Advantageously, the upper edge of the first wall portion includes a resiliently compressible abutment member.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended figures. Understanding that these figures depict only exemplary embodiments of the disclosure and are not therefore to be considered to be limiting of its scope, the principles herein are described and explained with additional specificity and detail through the use of the accompanying figures.

Preferred embodiments of the present disclosure will be explained in further detail below by way of examples and with reference to the accompanying figures, in which:

FIG. 2B depicts a right side view of the wall panel of FIG. 1.

FIG. 2C depicts a left side view of the wall panel of FIG. 1.

FIG. 0.7 depicts a cross sectional view of an exemplary arrangement when multiple wall panels are assembled together.

DETAILED DESCRIPTION OF THE INVENTION

Figure 1:
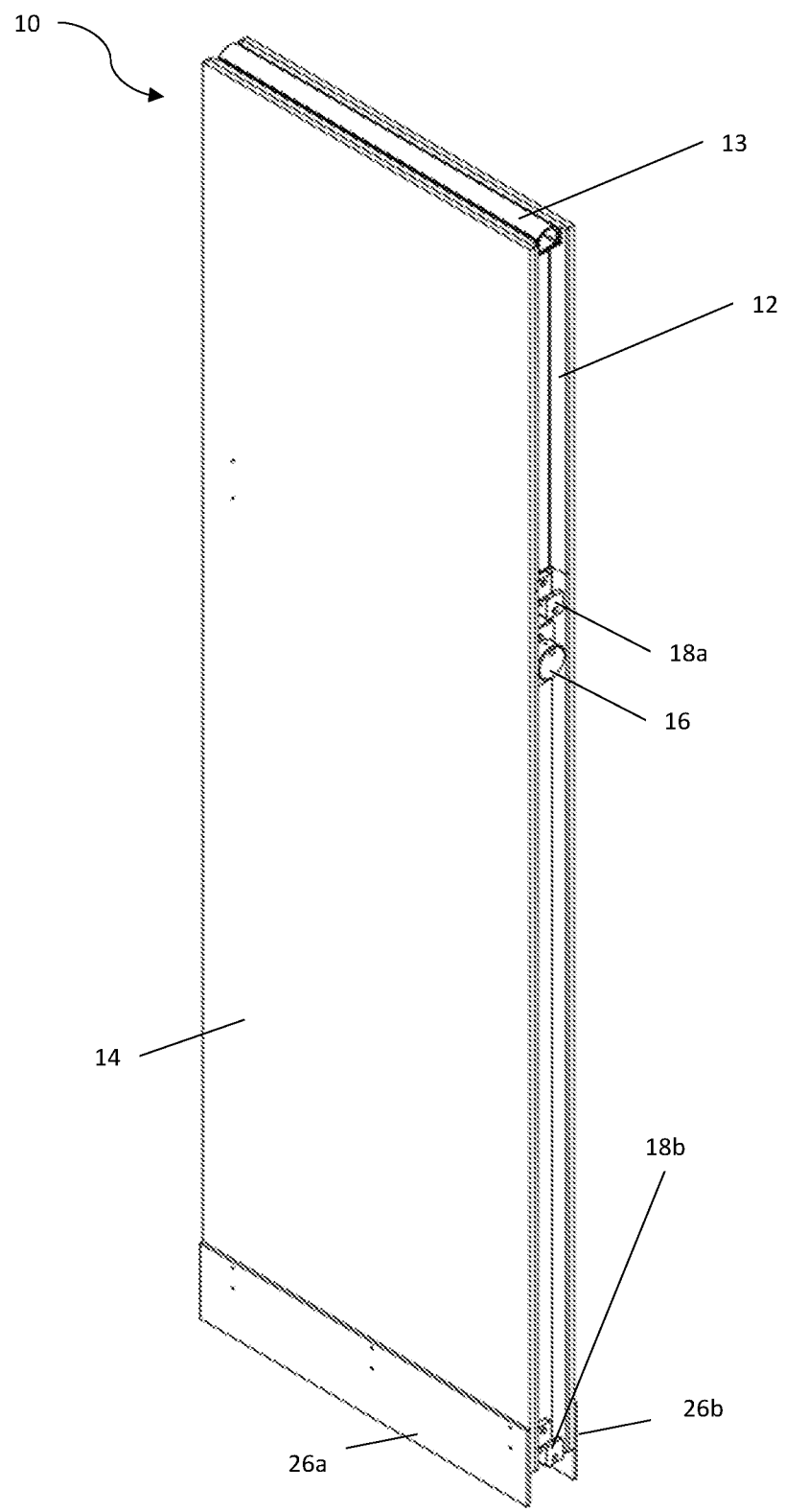
FIG. 1 depicts a perspective view of an embodiment of an exemplary wall panel in a fully retracted state with the first wall portion fully received within the second wall portion.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

In an aspect of the present disclosure depicted collectively in the Figures, there is shown a relocatable internal wall panel for a room having a floor and ceiling. The relocatable internal wall panel comprises a first wall portion and a second wall portion. The first wall portion is configured to be partly received within the void defined within the second wall portion in a retracted position and reversibly extendable from the second wall portion such that in the extended position the upper edge of the first wall portion bears against the ceiling of the room.

Referring to FIG. 1 and FIGS. 2A to 2D, there is shown a relocatable internal wall panel 10 in a fully retracted state. In this retracted state, the first wall portion 12 is fully received within the second wall portion 14. As will be discussed in detail below, the first wall portion 12 may be extended from the top edge of the second wall portion via an actuation mechanism 15. The actuation mechanism 15 is operated using a rotation shaft driven by an actuation collar 16 (for example, a hand or powered tool) so as to extend the first wall portion to the extended position (discussed in detail below).

Both of the first wall portion 12 and the second wall portion 14 may include an internal frame for supporting opposed planar surface. The frame of the second wall portion 14 is configured to define a void/an opening for receiving part of the frame of the first wall portion.

A resiliently compressible abutment member 13 may be provided on the top edge of the first wall portion 12 for better engagement between the first wall portion and the ceiling. Moreover, foot members 22a and 22b may be provided on the bottom edge of the second wall portion 12 to provide a support between the second wall portion and the floor of the room. It would be appreciated that the arrangement and number of foot members could be provided in alternative ways without departing from the present disclosure. The wall panel may further comprise two opposed fascia panels 26a and 26b for concealing the foot members and defining a cable space. This arrangement is advantageous that cables including but not limited to network cable, telephone cable, and power cable can be set and adjusted according to variable requirements and can be hidden. It can be appreciated that the material of abutment member may be similar to door/window rubber seal, or may be the same material as the planar surface of the wall panel. For example, the abutment member can be made of plastic rubber or foam.

Coupling members may be provided on the sides of the frame of the second wall portion of the wall panel 10 for linking adjacent wall panels to each other. For example, coupling members 18a and 18c (not shown) may be included as shown for securing one side of the second wall portion 14 near the top edge of the second wall portion 14.

Similarly coupling member 18b, 18d (not shown) may be included to secure at the lower portion and near the bottom edge of the second wall portion 14.

Figure 2A:
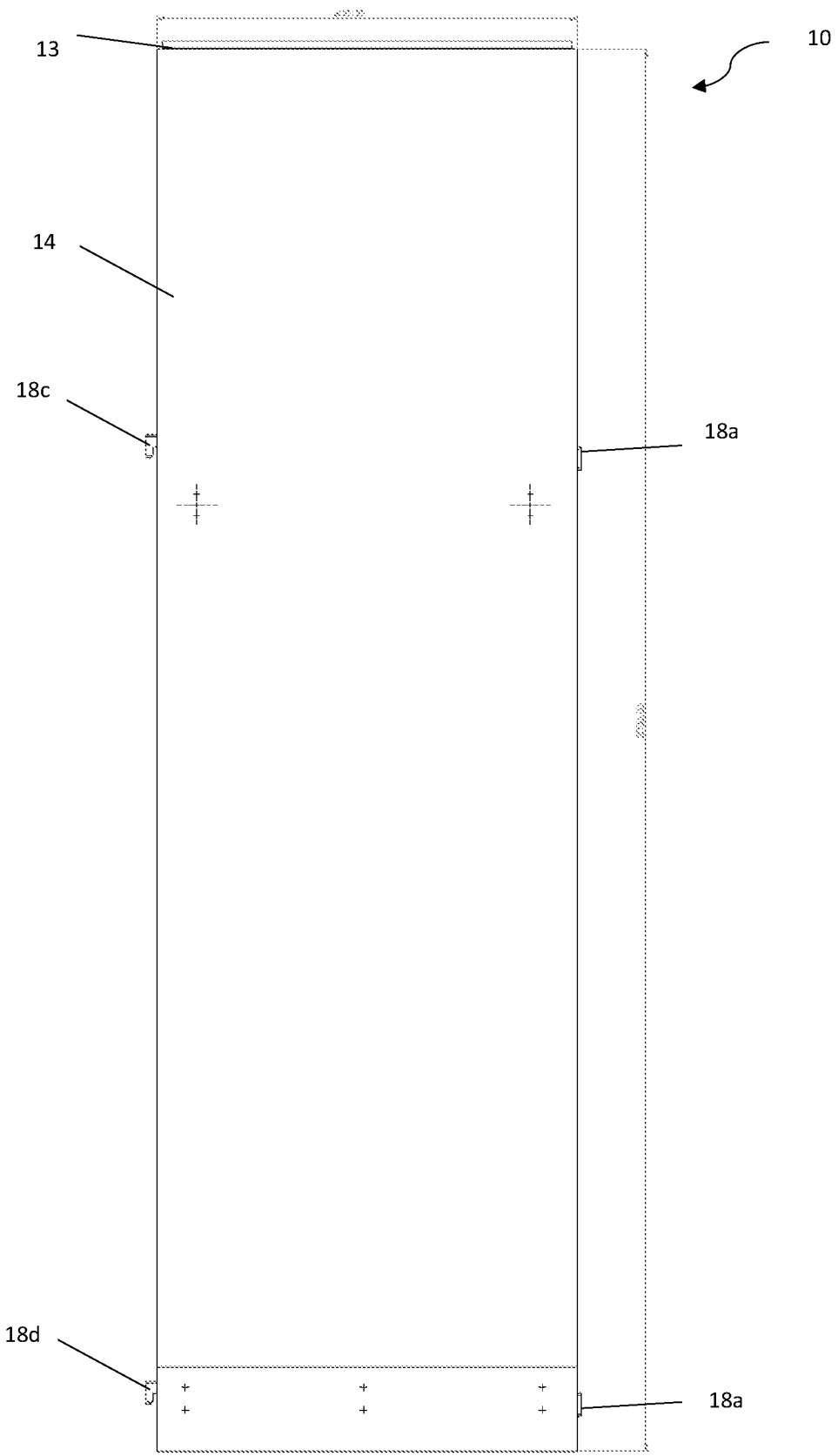
FIG. 2A depicts a front view of the wall panel of FIG. 1.
Figure 2D:
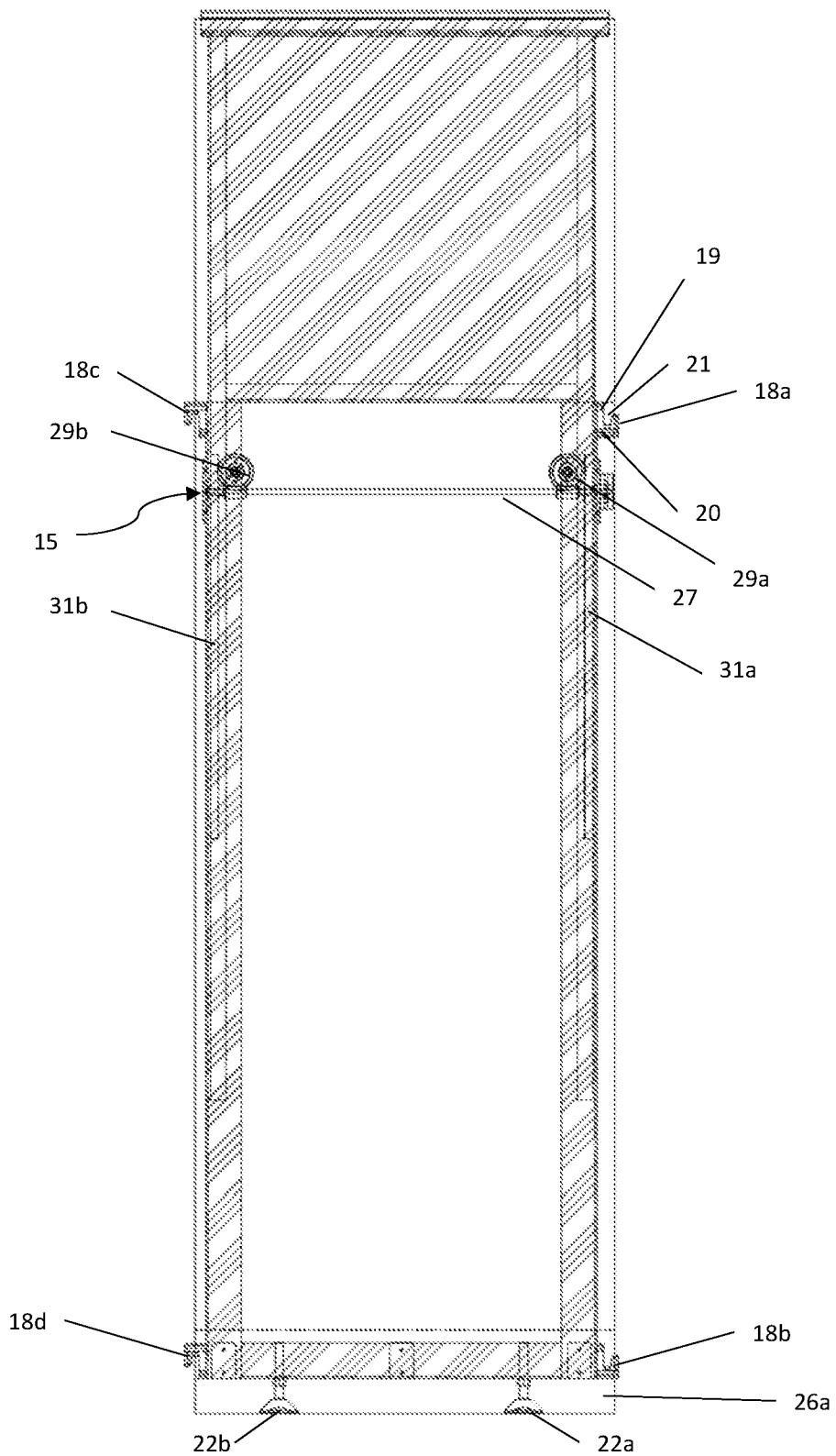
FIG. 2D depicts a cross sectional view of the wall panel of FIG. 1.

As shown in FIG. 2D, the coupling members may be hook shaped and comprises a coupling part 19 and a securing part 20 for fixing the adjacent coupling member onto the side of the frame of the second wall portion 14.

A groove 21 may be defined between a coupling part 19 and the securing part 20, such that a corresponding coupling part of a corresponding adjacent coupling members of a wall panel to be connected can slide into the groove 21 and be tightly secured within the groove 21 to create a removable linkage between the adjacent wall panels. It would be appreciated that other locations and numbers of adjacent coupling members are possible.

Now referring to FIG. 2D, an exemplary embodiment of the actuation member 15 is discussed in more detail. In the exemplary embodiment, the actuation member 15 is configured to transfer the rotational movement to a linear movement. The actuation member 15 depicted comprises a rotatable shaft 26, gear mechanism 29a and 29b and corresponding rack members 31a and 31b located on either side. As will be discussed in detail below (FIG. 6B), each of the gear mechanism may include a worm screw 27, a transverse shaft 28, a worm spur gear 32 and a worm wheel 34. The worm screw 27 may rotate as the shaft 26 rotates, driving worm wheel 34 and attached worm spur gear 32 to rotate on the transverse shaft 28 fixed in position in the side frame 35.

The rotatable shaft 26 extends between the side frames of the second wall portion 14 and is rotatable by driving an actuation collar 16 e.g. by using a rotary shaft of a hand or powered tool (such as a portable screwdriver or drill).

As the shaft 26 rotates, the gear mechanism 29a and 29b are driven via threaded engagement with the shaft to urge the rack members 31a and 31b. The rack member is fixed on the side frames of the first wall portion 12 and is urged upward and downward by the rotation of the gear mechanism 29a and 29b, respectively such that the first wall portion is urged to extend from or retract into the second wall portion (discussed in more detail with reference to FIGS. 3, 4A-4D).

Figure 3:
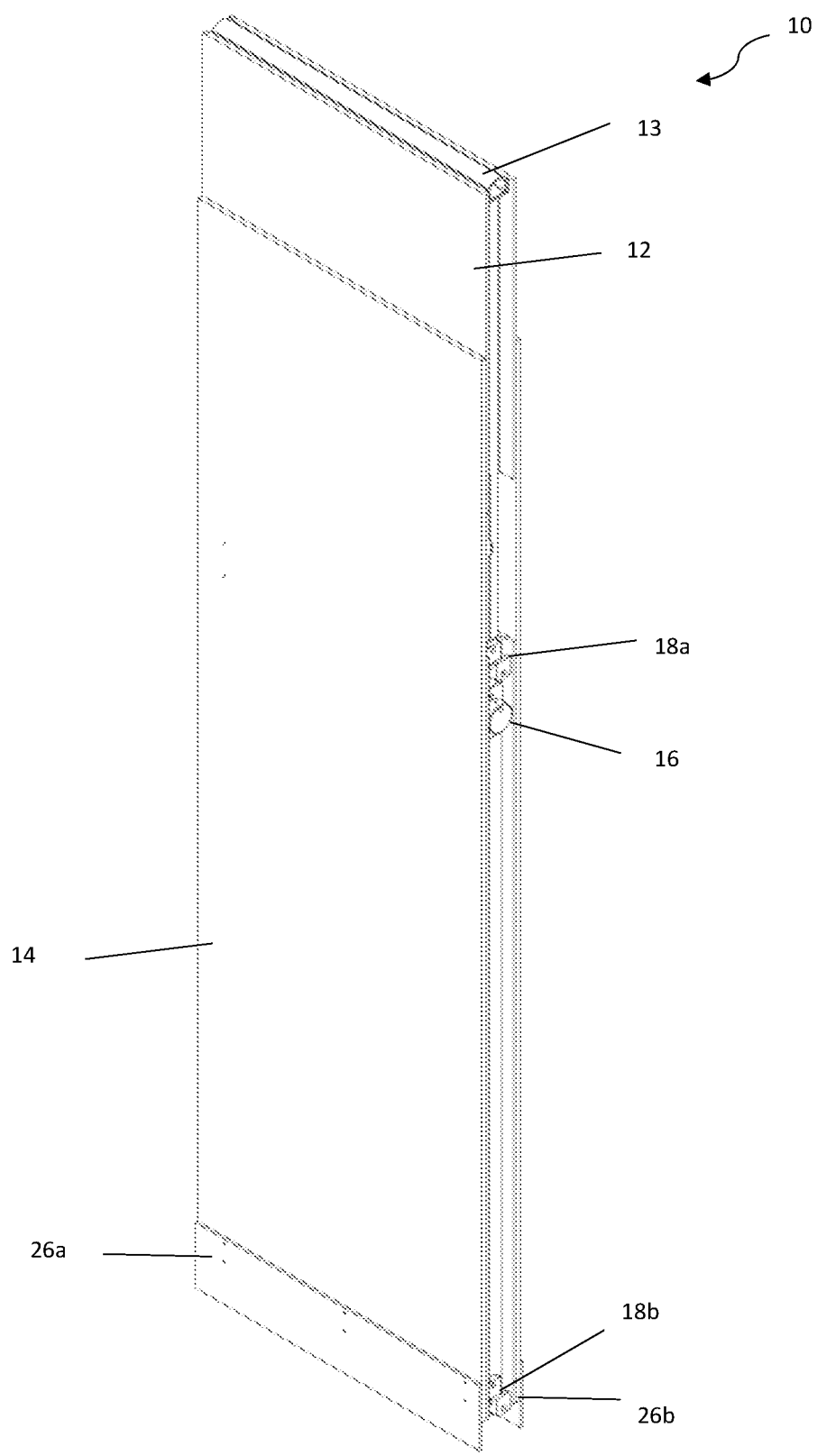
FIG. 3 depicts a perspective view of the exemplary wall panel depicted in FIG. 1, wherein the wall panel is in an extended state with the first wall portion extended from the second wall portion.

FIG. 3 shows a perspective view of the exemplary wall panel depicted in FIG. 1, wherein the wall panel is in an extended state with the first wall portion extended from the second wall portion. As shown, the first wall portion 12 is extended from the second wall portion 14 by the operation of the actuation member 15 such that the whole height of the wall panel is increased to adapt a particular spatial requirement of the room in which the wall panel is deployed.

Figure 4A:
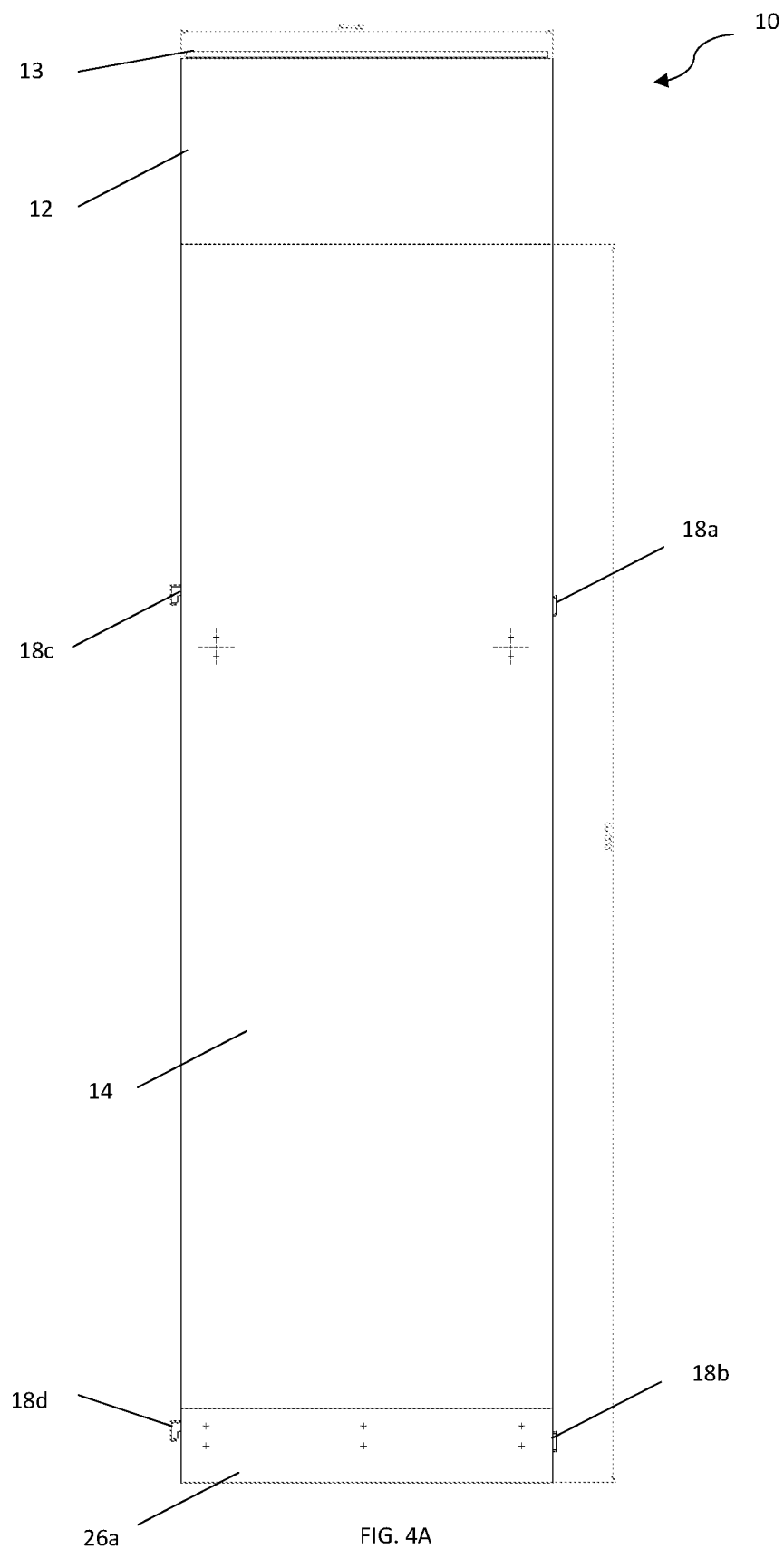
FIG. 4A depicts a front view of the wall panel as depicted in FIG. 3.
Figures 4B, 4C:
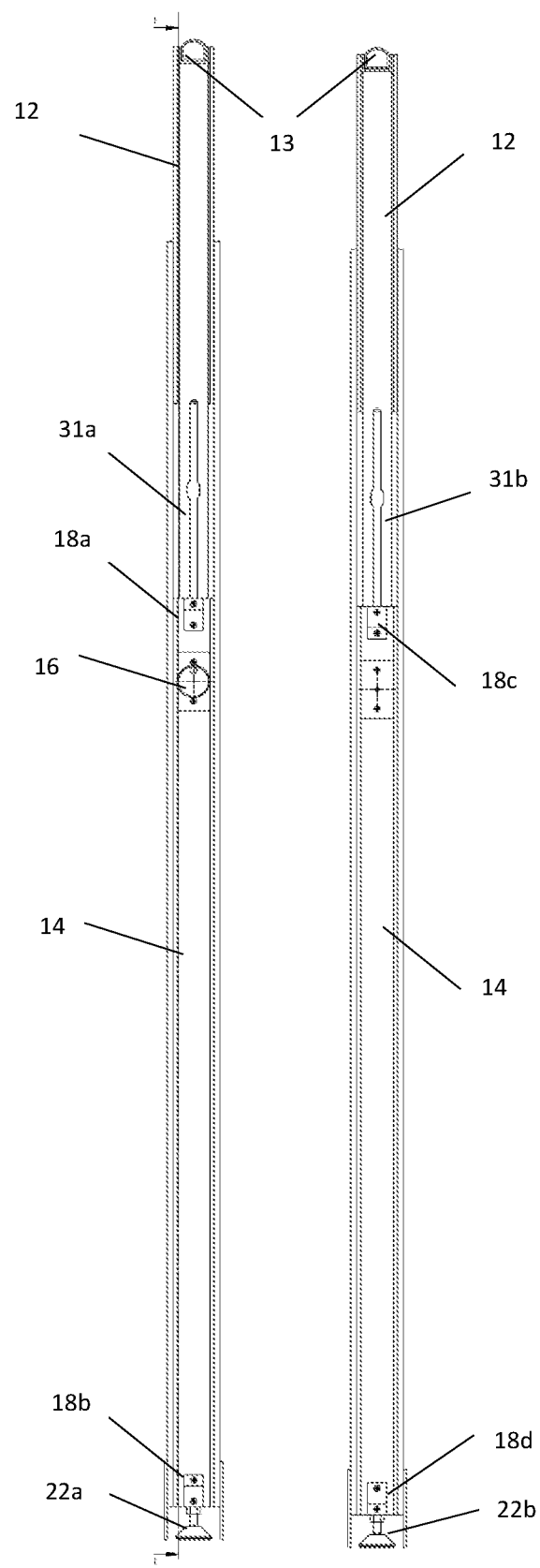
FIG. 4B depicts a right side view of the wall panel as depicted in FIG. 3.
FIG. 4C depicts a left side view of the wall panel as depicted in FIG. 3.

FIGS. 4A to 4C depict a front view, a right side view, a left side view of the wall panel respectively in an extended state as depicted in FIG. 3. In this extended state the first wall portion 12 is extended from the second wall portion 14 so that the resiliently compressible abutment member 13 abuts against the ceiling of the room in which the wall panel is installed. The extension of the first wall panel is driven by the rotational shaft 26 (not shown).

As depicted, when deployed in the extended state to span between the ceiling and the floor, the wall panel is firmly received in place and can define internal spaces within the room flexibly and in whatever configuration is required.

In the figures the exemplary width of the wall panel 10 is 600 mm while the exemplary length of the wall panel in the fully retracted state shown is around 2000 mm and the exemplary length of the wall panel in the fully extended state shown are around 2800 mm although it would be appreciated that other dimensions would also be possible.

Figure 4D:
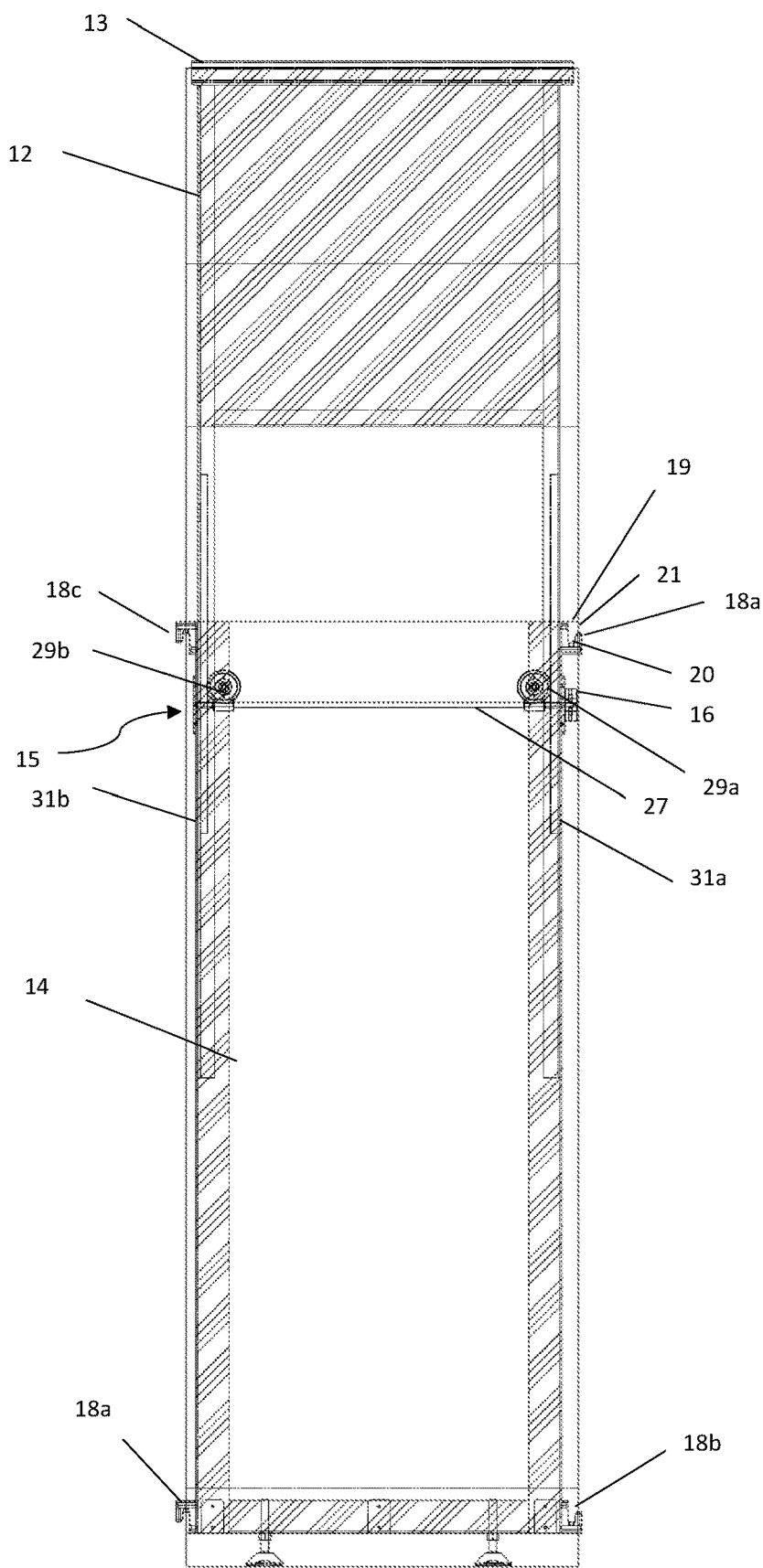
FIG. 4D depicts a cross sectional view of the wall panel as depicted in FIG. 3.

FIG. 4D depicts a cross sectional view of the wall panel depicted in FIG. 3.

Similarly, the actuation member 15 depicted comprises a rotatable shaft 26, gear mechanism 29a and 29b and corresponding rack members 31a and 31b located on either side. The rotatable shaft 26 extends between the side frames of the second wall portion 14 and is rotated by an actuation collar 16 which in itself may be driven by the rotary shaft of a hand or powered tool.

The rack member is fixed on the side frames of the first wall portion 12 and is urged upwards and downwards relative to the side frame of the second wall portion 14 by rotation of the gear mechanism 29a and 29b, respectively such that the first wall portion is urged to extend from the second wall portion.

Particularly, as the shaft 26 rotates, the gear mechanism 29a and 29b also rotate via threaded engagement with the shaft 26 such that the toothed rack members 31a and 31b mesh with the teeth of the worm spur gear 32 of the gear mechanism 29a and 29b and are urged upward. As the first wall portion is fixed to the rack members, the first wall portion 12 are urged upward. It would be appreciated that other mechanisms to transfer and change the rotational movement to the linear movement would also be possible and would not depart from the scope of the disclosure.

Figure 5:
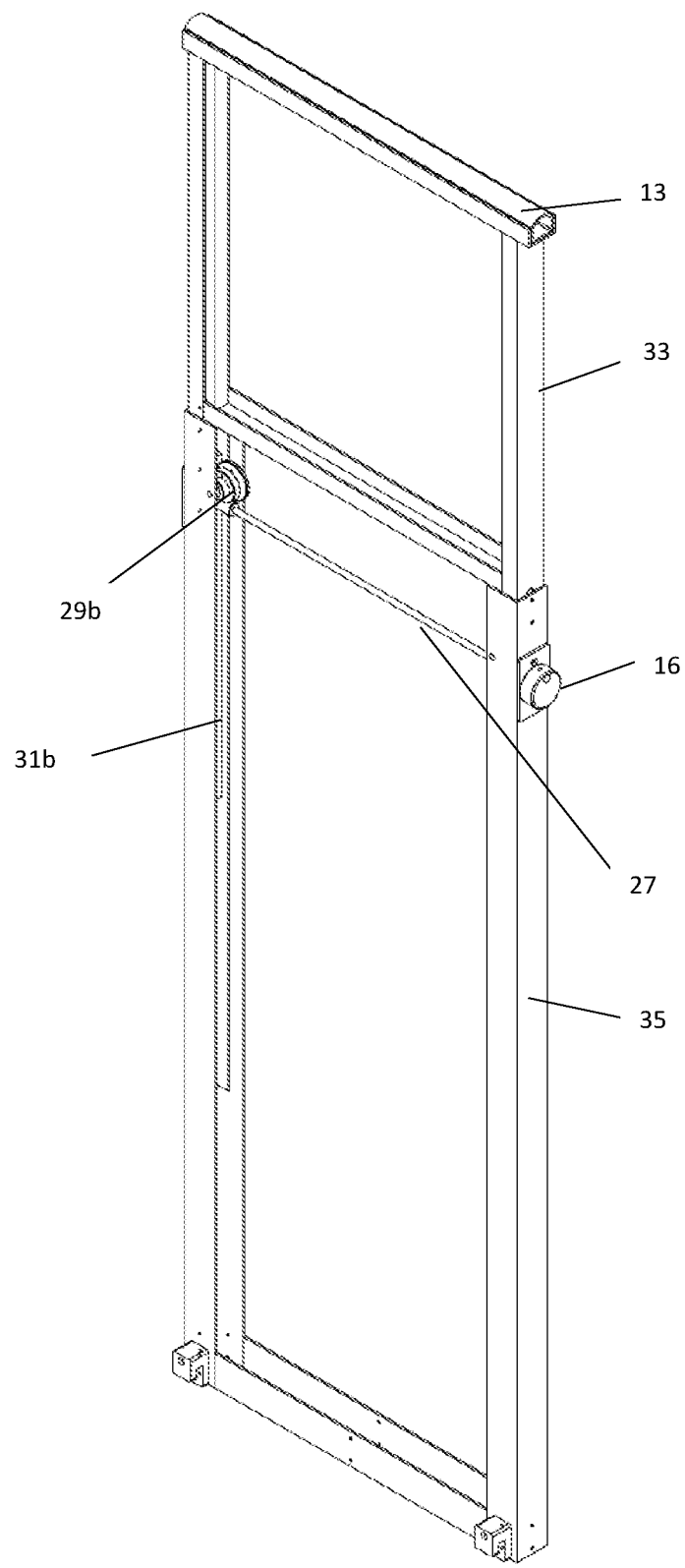
FIG. 5 depicts a cross sectional view of the wall panel of FIG. 1 with planar covering surfaces removed for clarity.
Figure 6A:
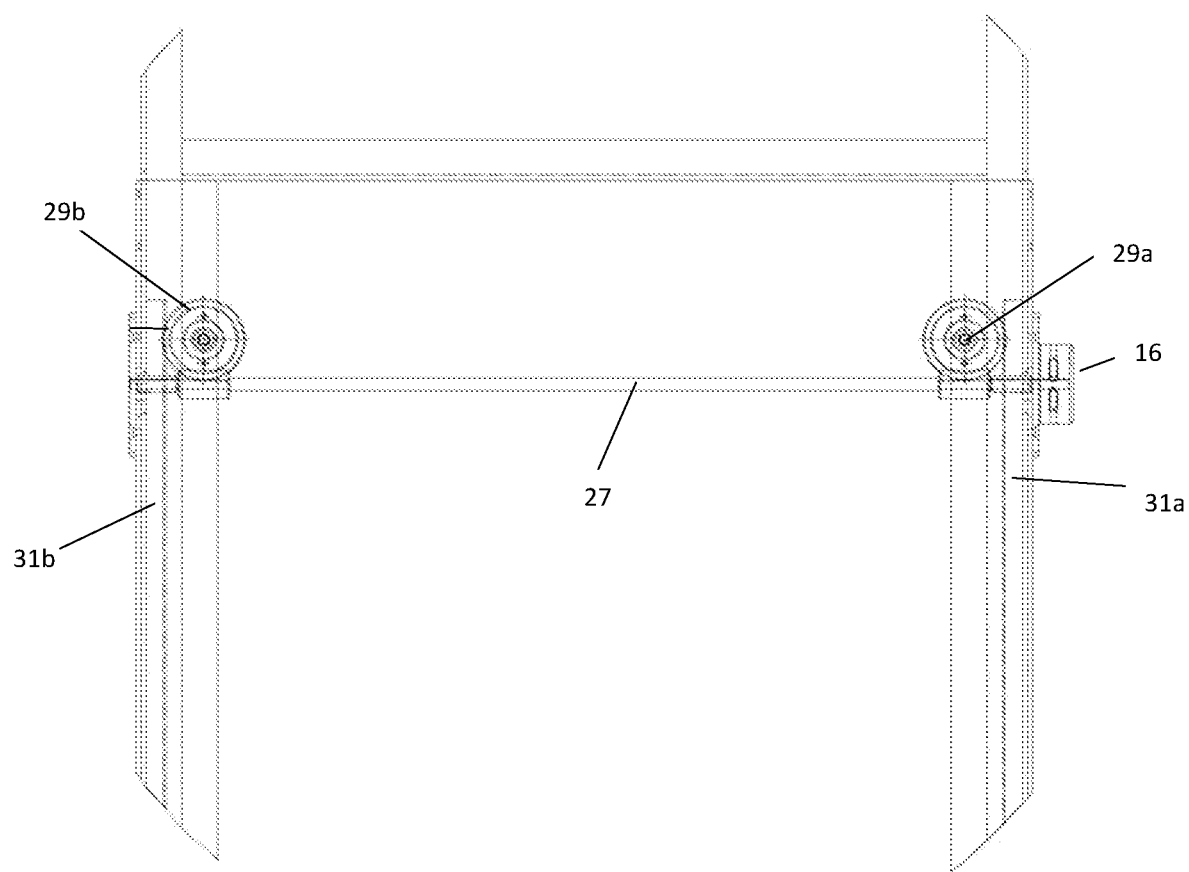
FIGS. 6A and 6B depict a cross sectional view of an exemplary extension mechanism for the wall panel depicted in FIGS. 1-5.
Figure 6B:
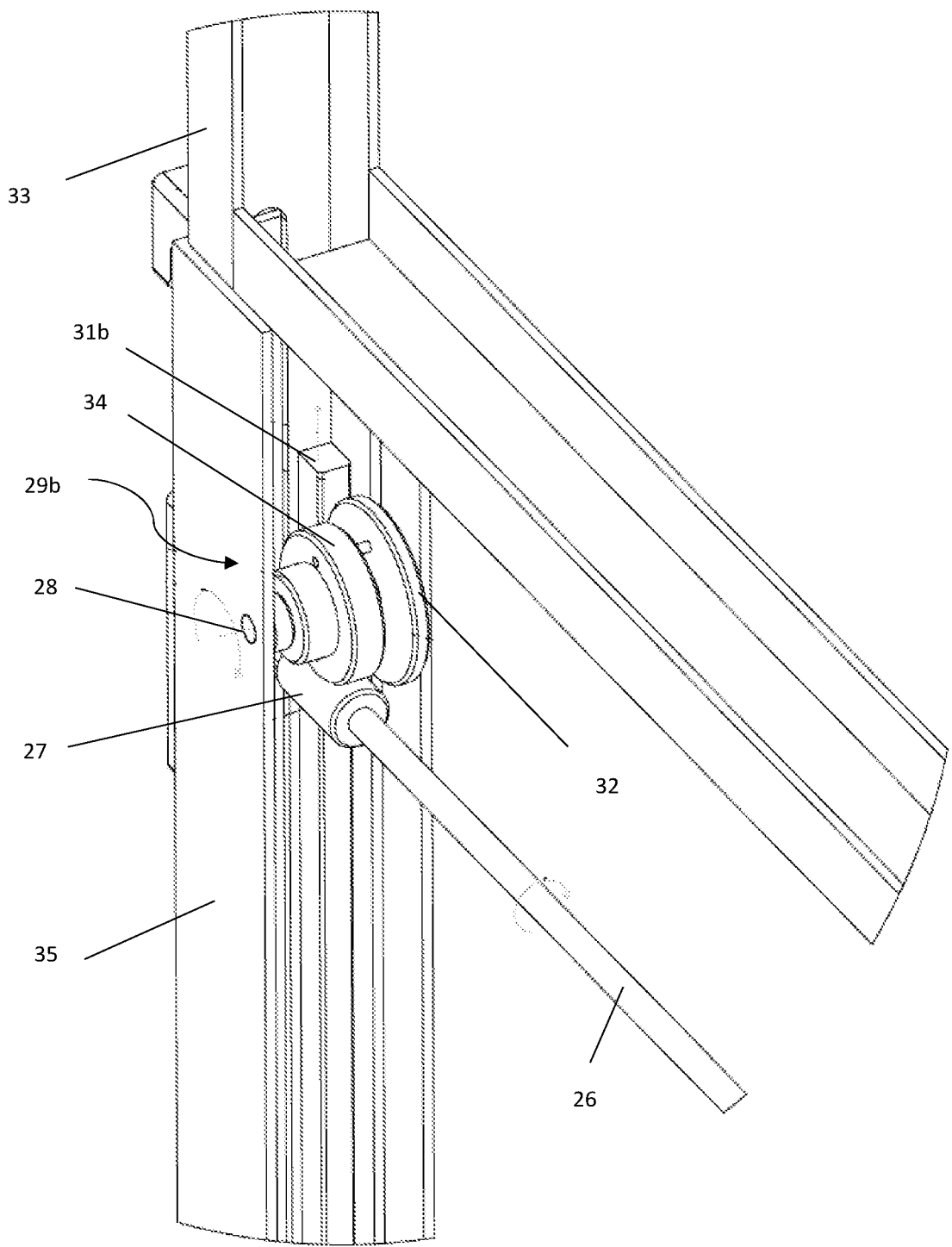
Figure 7:
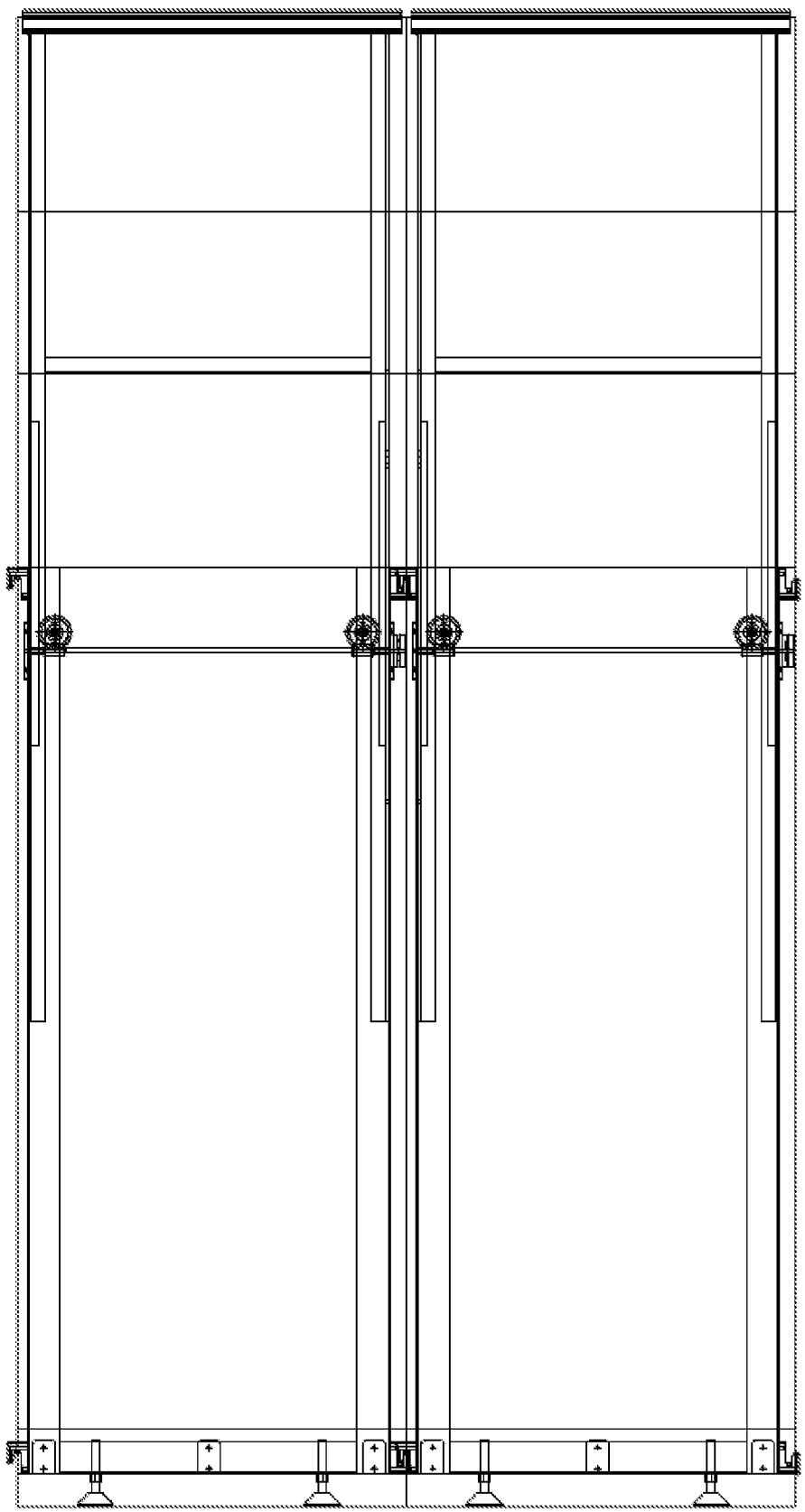

Now referring to FIG. 5 and FIGS. 6A and 6B the extension mechanism is displayed in more detail. FIG. 5 depicts a cross sectional view of the wall panel of FIG. 1 with planar covering surfaces removed for clarity. FIG. 6A depicts a partial cross sectional view of the extension mechanism for the wall panel depicted in FIGS. 1-5 and FIG. 6B depict the extension mechanism in detail.

As shown in FIG. 5, the side frame 33 of the first wall portion is received within a void in the second wall portion and engaged with the side frame 35 of the second wall portion via the rack members 31a, 31b. The side frame 35 is fixed while the side frame 33 is movable relative to the side frame 35. The rack members 31a and 31b are secured on the inner side of the side frame of the first wall panel. The side frame 33 of the first wall portion is sized to be received at least partially within the side frame 35 of the second wall portion.

As discussed above, the rack members 31a and 31b are moveable upward or downward along the side frame 35 of the second wall portion upon the operation of the actuation collar 16 which rotates the rotation shaft 26 and gear mechanism 29a and 29b against the rack members to extend or retract the first wall portion. Advantageously, the covering surfaces of the second wall portion may overlap fully with the covering surfaces of the first wall portion, such that in the retracted state, the first wall portion is not visible, with only the abutment member 13 visible at the top of the combined unit (when in an assembled state) as shown in FIG. 1. Alternatively (not shown), the first panel may protrude from the second panel depending on the relative sizes thereof.

To change from the retracted state to the extended state, the frame 33 is actuated to extend from the top edge of the covering surfaces of the second wall portion by the operation of the collar 16 as discussed above.

Now referring to FIGS. 6A and 6B, an exemplary extension mechanism is depicted in more detail. In the embodiment of the extension mechanism depicted, and as described above, the extension mechanism extends the first wall portion from partially within a void within the second wall portion; to bear against the ceiling of the room in which the relocatable wall panel is located. The extension mechanism changes rotational movement of the shaft 26 to linear movement of the rack member 31a and 31b; and the first wall portion to which the rack members are attached as discussed in more detail below.

The shaft 26 extends between the side frame 35 of the second wall portion across to the other side frame of the second wall portion (not shown) essentially within the plane of the wall.

The worm screw 27 rotates as the shaft 26 rotates; driving the worm wheel 34 and attached worm spur gear 32 to rotate on the transverse shaft 28 fixed in position in the side frame 35.

Rotation of the worm spur gear 32 against the racks 31a and 31b then drives the racks towards or away from the transverse shaft 28 (depending on the direction of rotation of the spur gear and in turn the shaft 26), extending or retracting the first wall portion from/into the second wall portion. It can be appreciated that other extension mechanism(s) would also be possible without departing from the present disclosure.

In use, multiple wall panels extended between the floor and the ceiling are assembled together so as to separate the room into sections. FIG. 0.7 depicts a cross sectional view of an exemplary arrangement when multiple wall panels are assembled together. As shown, adjacent wall panels are configured to connect to each other by engagement of coupling members and extend between the floor and the ceiling. It can be appreciated that more than two wall panels can be connected so as to adapt to the distance between structural or other fixed walls within the room.

The wall panels can be made of Medium-density fibreboard (MDF) board with a dimension of 600 mm(W)×2000 mm(H), but other materials such as aluminium are possible. Advantageously, it would be appreciated that the inclusion of aluminium components of the frame and/or planar surfaces of the panel can reduce weight of the wall panel and enhance portability/ease of installation.

Now referring to FIGS. 8-13, there is described another embodiment of the relocatable internal wall panel 40 in a further aspect of the present disclosure. Similar to the wall panel 10 discussed with reference to FIGS. 1-7, the wall panel 40 also comprises a first wall portion 50 and a second wall portion 60. An abutment member 52 may be provided on the top of the first wall panel portion 50.

As depicted, two foot members 83a and 83b may be provided extending from the side frame of the second wall panel portion 60 to support the second wall portion on the floor of the room. The wall panel depicted also comprises two opposed fascia panels 81a and 81b for concealing the foot members and defining a cable space.

The first wall portion 50 of the wall panel 40 is also be received within the frame of the second wall panel portion 60 (as shown in a fully retracted state in FIGS. 8, 9A-9D) and in an extended state extending from the top edge of the second wall portion (as shown in FIGS. 10, 11A-11D) via an actuation mechanism 70 (will be discussed in detail below). It is appreciated that elements/members of the wall panel 40 discussed have similar or the same functions as those of the wall panel 10 unless as stated otherwise.

Figure 12:
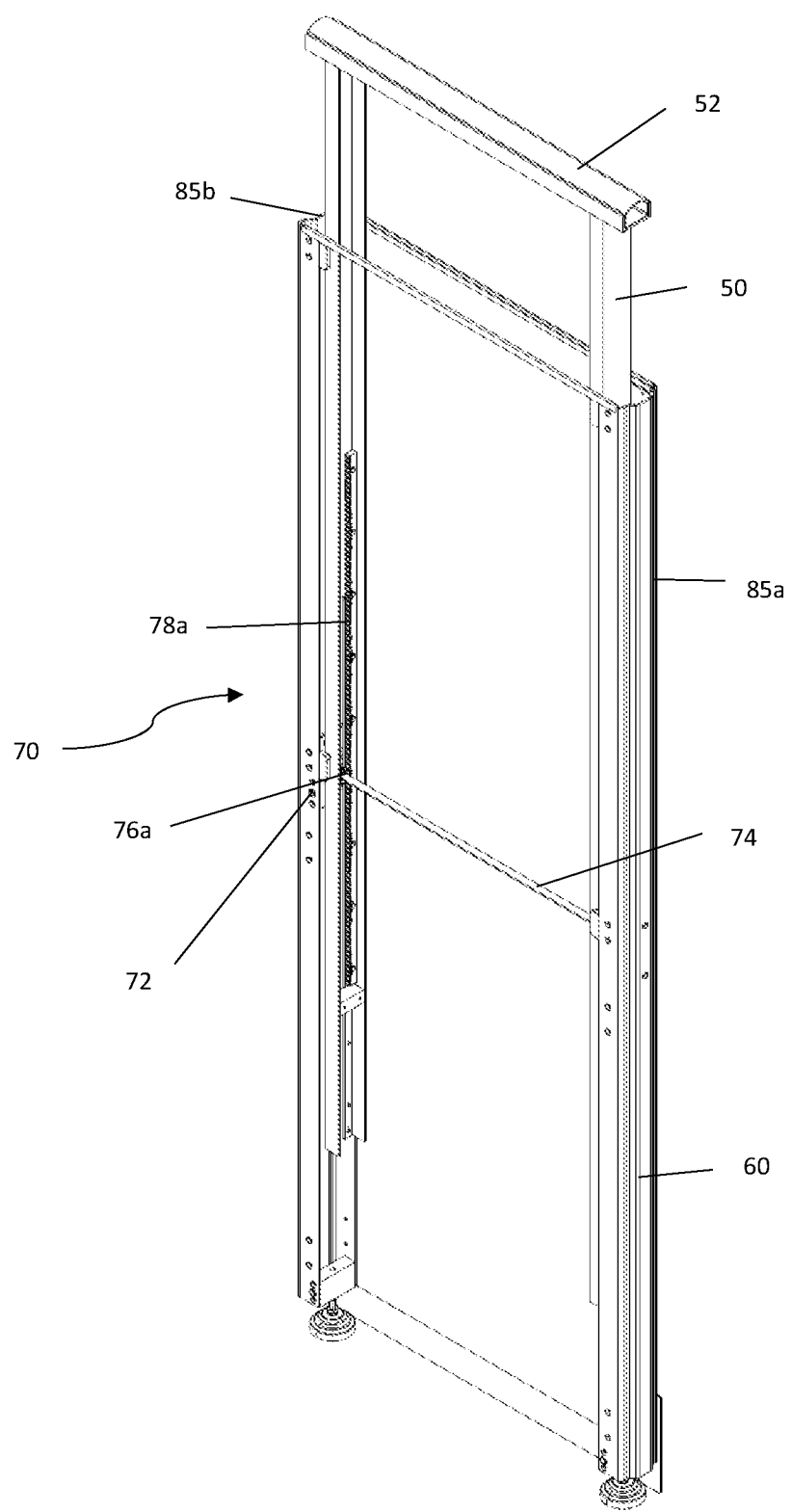
FIG. 12 depicts a perspective view of the wall panel of FIG. 8 with planar covering surfaces removed for clarity.

With reference to FIG. 12, an exemplary embodiment of the actuation member 70 is discussed in more detail. In the exemplary embodiment, the actuation member 70 changes as rotational force supplied by a powered tool such as a drill or screwdriver to a linear extension/retraction of the first wall panel. In contrast to the actuation member 15 of the wall panel 10, the actuation member 70 of the wall panel 40 comprises a rotatable shaft 74, pinions 76a and 76b and rack members 78a and 78b. The shaft 74 is configured to extend between the side frames of the second wall panel portion 60 and have the pinions 76a and 76b arranged at the ends. The pinons are engageable with the corresponding rack members 78a and 78b which are located on either side frame of the first wall panel portion 50.

To change rotation of the shaft 74 into linear movement of the first wall portion, the shaft 74 is configured to be driven by externally driven rotation of an actuation element 72 (for example, a hex socket). As the shaft 74 is driven in rotation, the pinions 76a and 76b rotate against the rack members to urge the rack members 78a and 78b upward or downward. Accordingly, the first wall portion 50 is urged from or retracted into the second wall portion 60. It can be understood that a rack member/corresponding pinion could be arranged on either side frame of the first wall panel portion 60 or advantageously on both side frames of the first wall panel portion for smoother movement without departing from the present disclosure.

Figure 8:
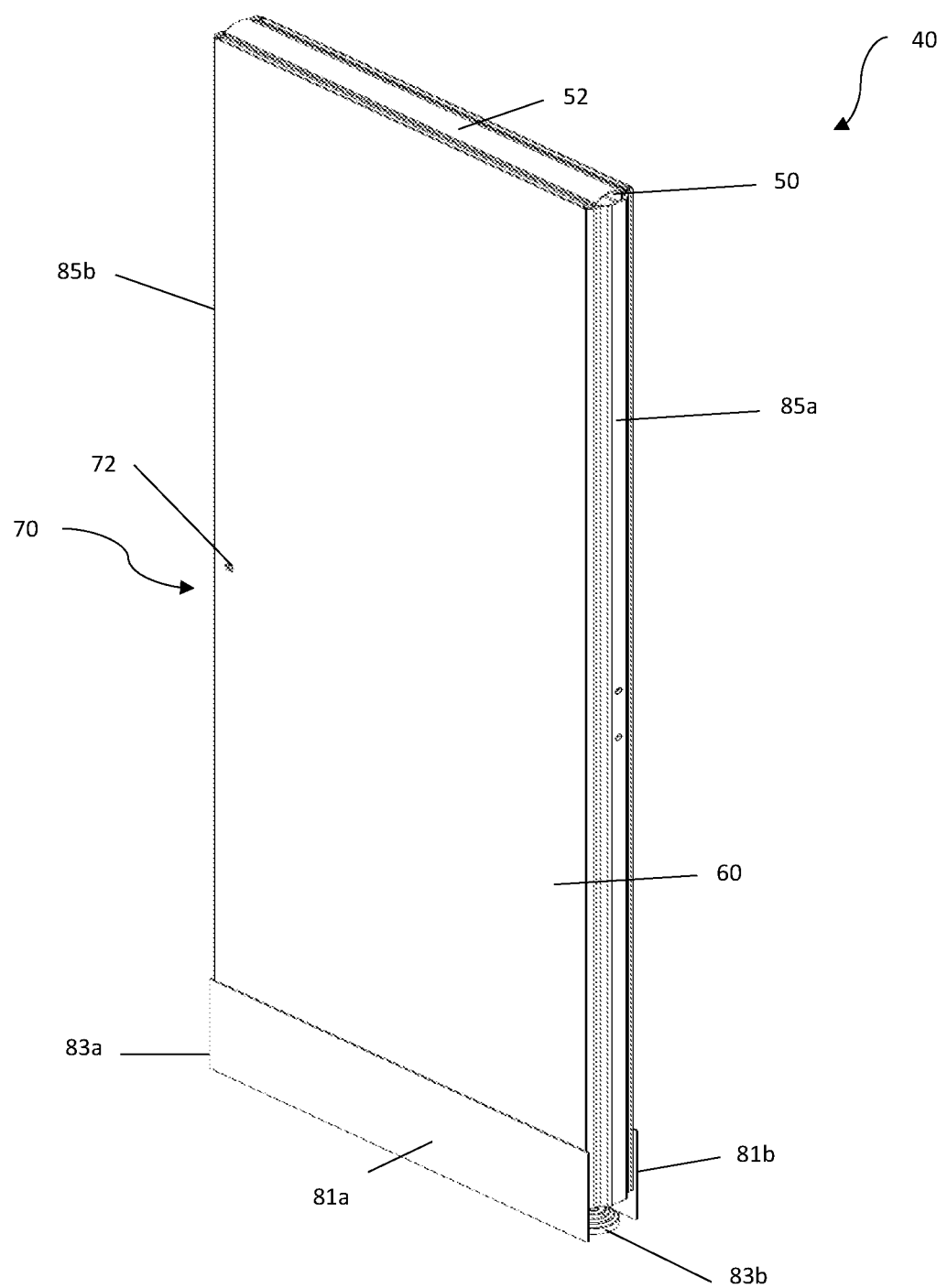
FIG. 8 depicts a perspective view of another embodiment of an exemplary wall panel in a fully retracted state with the first wall portion fully received within the second wall portion
Figure 9A:
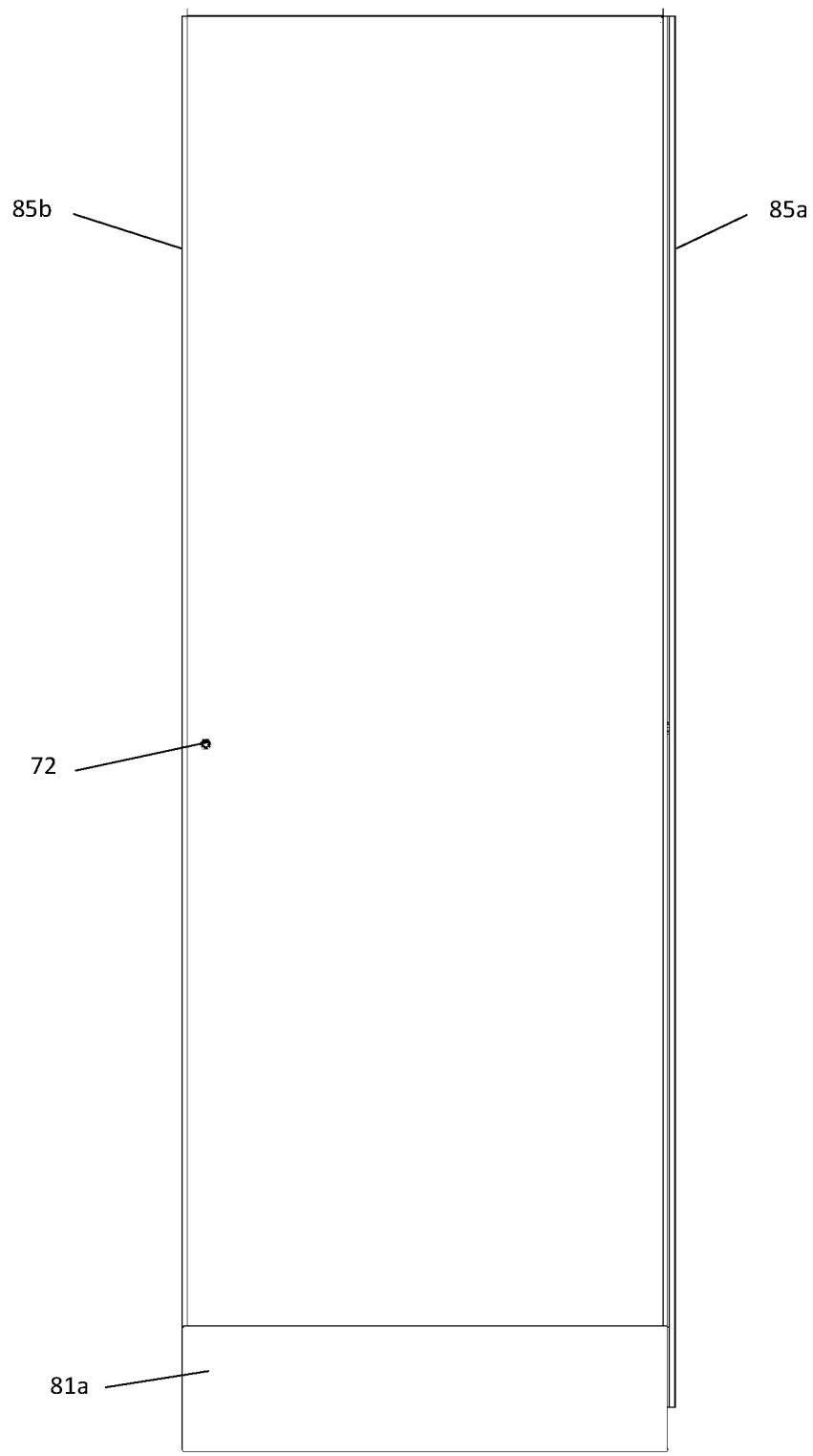
FIG. 9A depicts a front view of the wall panel of FIG. 8.
Figure 9B:
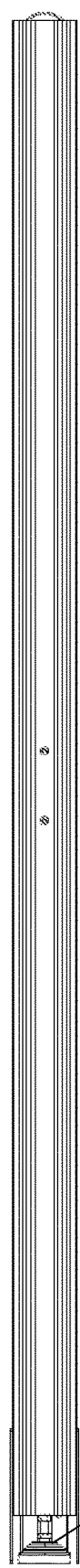
FIG. 9B depicts a right side view of the wall panel of FIG. 8.
Figure 9C:
FIG. 9C depicts a left side view of the wall panel of FIG. 8.
Figure 9D:
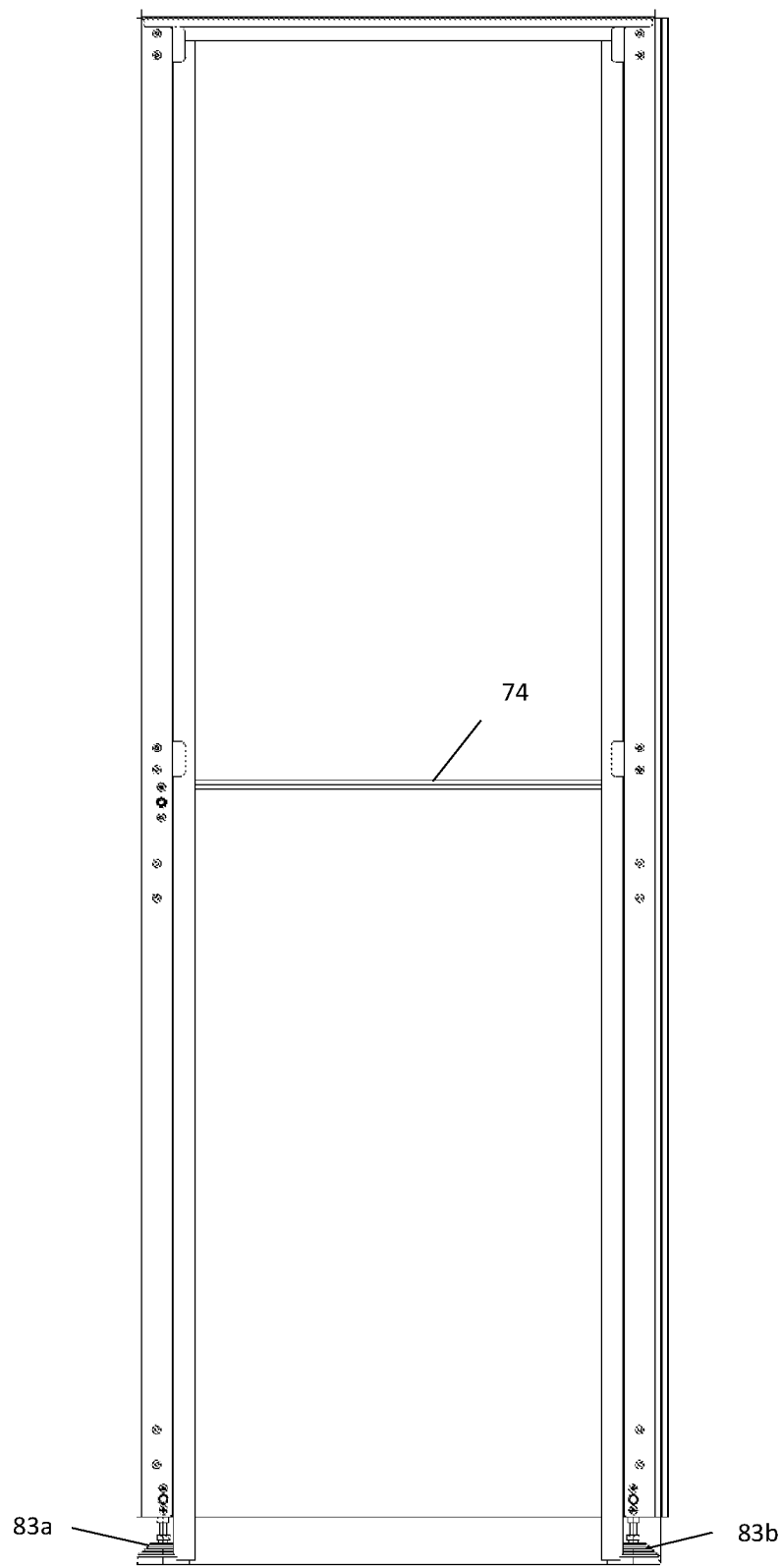
FIG. 9D depicts a cross sectional view of the wall panel of FIG. 8.
Figure 10:
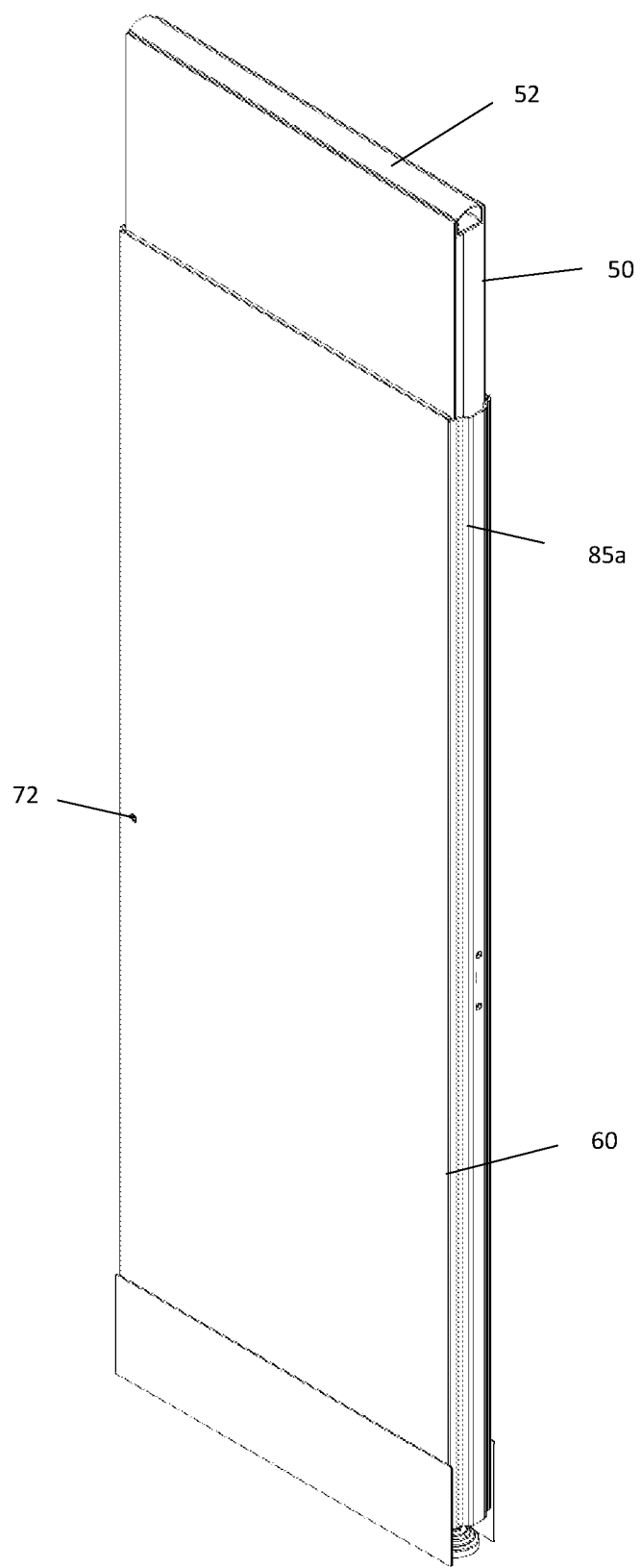
FIG. 10 depicts a perspective view of the exemplary wall panel depicted in FIG. 8, wherein the wall panel is in an extended state with the first wall portion extended from the second wall portion.
Figure 11A:
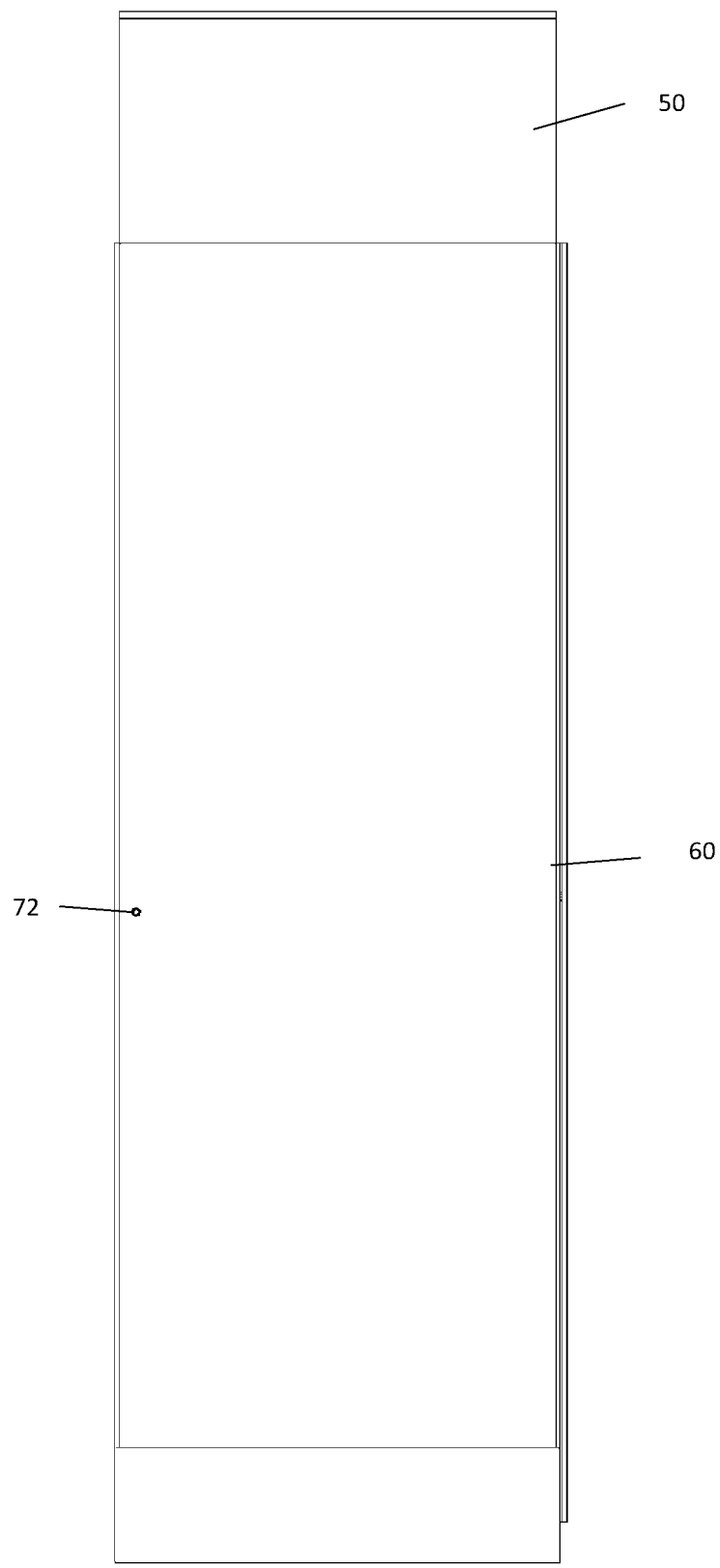
FIG. 11A depicts a front view of the wall panel as depicted in FIG. 10.
Figure 11B:
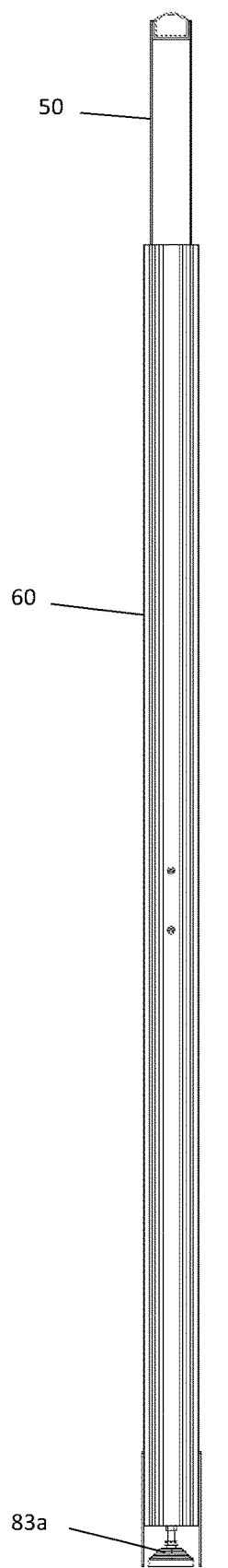
FIG. 11B depicts a right side view of the wall panel as depicted in FIG. 10.
Figure 11C:
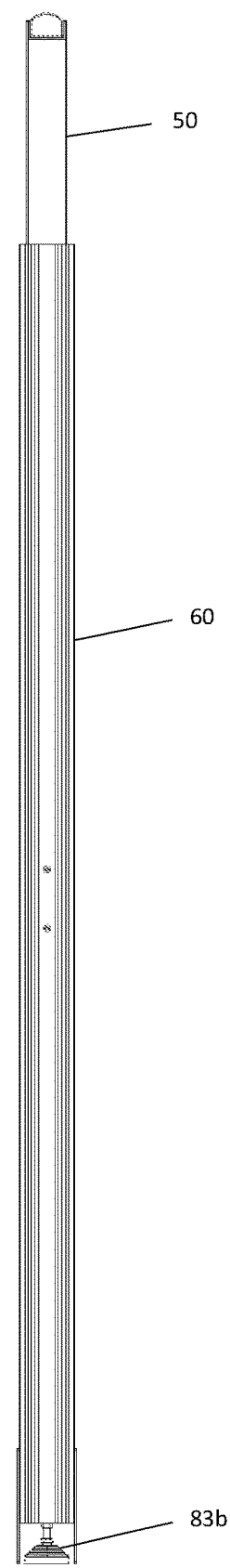
FIG. 11C depicts a left side view of the wall panel as depicted in FIG. 10.
Figure 11D:
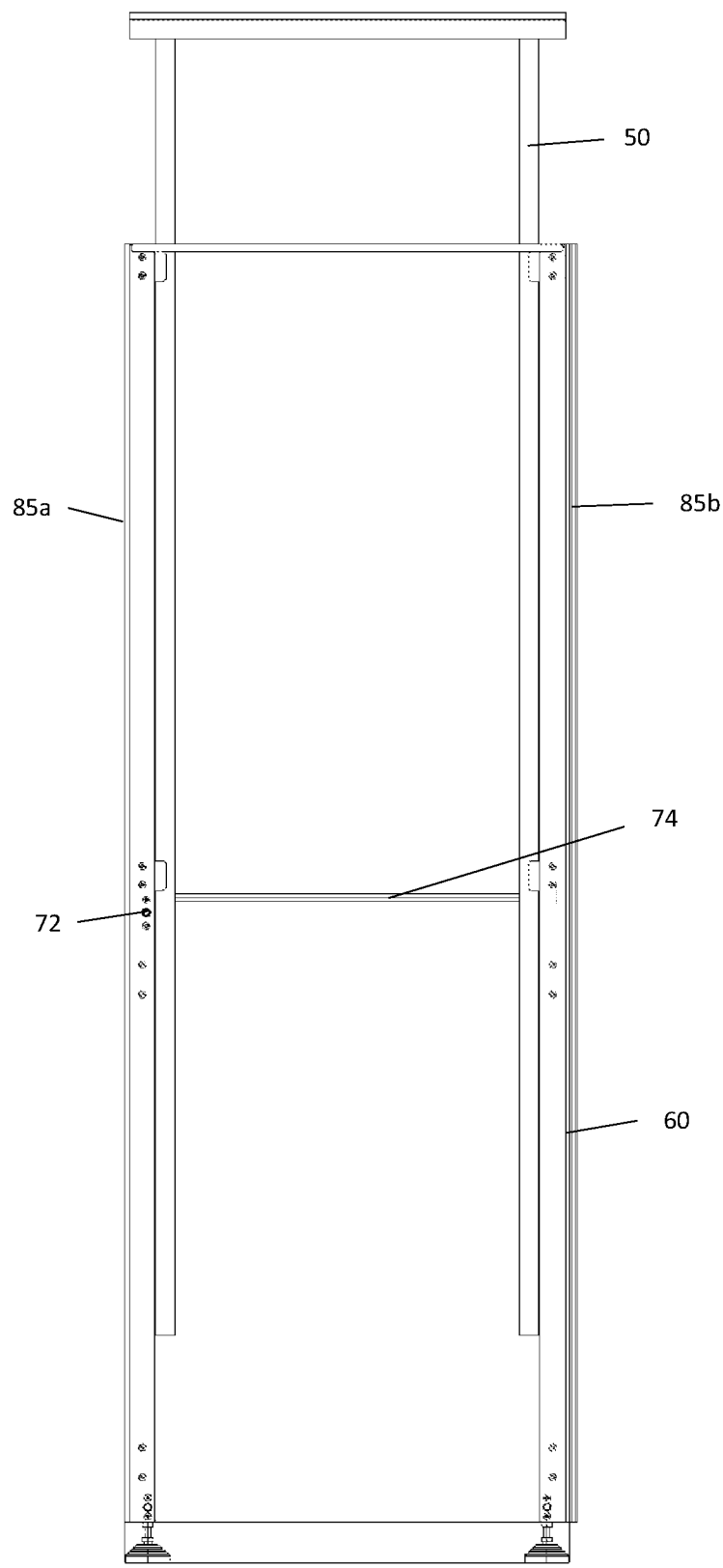
FIG. 11D depicts a cross sectional view of the wall panel as depicted in FIG. 10.

Furthermore, as shown in FIG. 8 and FIG. 12, complementary coupling members 85a and 85b may be provided for engaging multiple adjacent wall panels of the present disclosure together. In contrast to the coupling members 18a, 18b, 18c, 18d of the wall panel 10, the coupling member 85a is a convex profile extending from the frame of the second wall portion of the first wall panel, while the coupling member 85b is a complementary concave profile extending from the side frame of the adjacent second wall panel. It would be appreciated that alternate complementary profiles from the convex/concave profiles could also be provided which could be similar engageable with each other without departing from the present disclosure. In the embodiment depicted, the convex profile of the second wall portion of a first wall panel is shaped to engage with a corresponding complementary concave profile of a second wall portion of the adjacent second wall panel for assembly.

Figure 13:
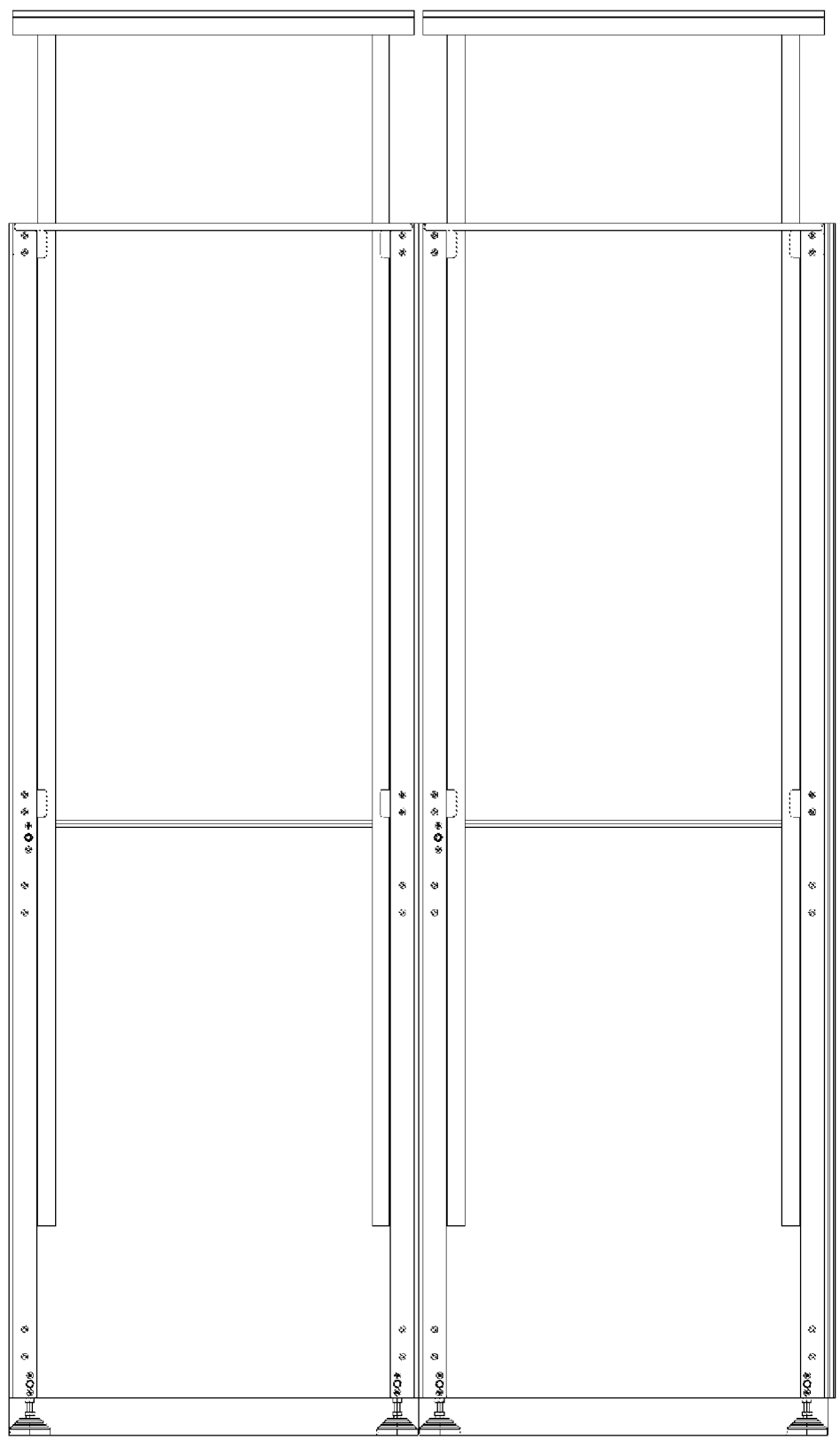
FIG. 13 depicts a cross sectional view of an exemplary arrangement when multiple wall panels are assembled together.

FIG. 13 shows adjacent wall panels which are connected with each other by engagement of corresponding complementary coupling members which extend between the floor and the ceiling of the room. It can be appreciated that more than two wall panels can be connected so as appropriate to span between structural or other fixed walls within the room.

In the figures the exemplary width of the wall panel 40 is 600 mm while the exemplary length of the wall panel in the fully retracted state shown is around 1800 mm and the exemplary length of the wall panel in the fully extended state shown are around 2630 mm although it would be appreciated that other dimensions would also be possible.

It would be appreciated that the wall panel of the present disclosure enables rapid, flexible separation of a room environment. As compared with tracked panels, the wall panel of the present disclosure is more flexible and can be rapidly installed and removed in almost any configuration without requiring qualified tradespersons. For example, there is no need to drill any permanent hole on structural or fixed walls to install/set the wall panel. Also, as there are few parts of the wall panel to be assembled/disassembled, the installation/re-movement is fast and easy.

Advantageously, with the wall panels of the present disclosure, the overall thickness can be smaller as compared to other prior art panels. This is because no extra parts are needed on the edge of the top/bottom frame of the wall panels of the present disclosure (in the case of tracked panels, room is needed to install tracks on the edge of the panel, therefore, the tracked panel needs to be relatively thicker).

The extendable wall portion provided is more adaptable as it facilitates the same wall panel to fit within rooms of various heights, and extend from the ceiling of the room to the floor. Furthermore, the extendable wall portion can be retracted to reduce space consumed in a folding concertina or accordion structure at the side or back of the room to facilitate storage when not deployed.

The above embodiments are described by way of example only. Many variations are possible without departing from the scope of the disclosure as defined in the appended claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components systems and methods within the scope of the appended claims.

What is claimed is:

1. A relocatable internal wall panel for a room having a floor and ceiling, the wall panel comprising:
   a first wall portion;
   a second wall portion comprising opposed planar surfaces defining a void therebetween;
   wherein the first wall portion is at least partly received within the void defined within the second wall portion in a retracted position and reversibly extendable therefrom such that in the extended position the upper edge of the first wall portion bears against the ceiling of the room; and
   wherein at least one toothed rack member is affixed along at least one side of the first wall portion and at least one corresponding meshing gear is mounted on the second wall portion.

2. The relocatable internal wall panel of claim 1, wherein the at least one corresponding meshing gear is coupled to a rotatable shaft for urging the at least one rack member and the first wall portion from out of the void of the second wall portion to an extended position.

3. The relocatable internal wall panel of claim 2, wherein the at least one corresponding meshing gear is configured for coupling to the shaft of a rotary hand tool or powered tool.

4. The relocatable internal wall panel of claim 1, wherein the at least one corresponding meshing gear is configured for coupling to the shaft of a rotary hand tool or powered tool.

5. A relocatable internal wall system for a room having a floor and a ceiling, the system comprising:
   a plurality of relocatable internal wall panels, wherein at least one of the wall panels comprises a first wall portion and a second wall portion comprising opposed planar surfaces defining a void therebetween, wherein the first wall portion is at least partly received within the void defined within the second wall portion in a retracted position and reversibly extendable therefrom such that in the extended position the upper edge of the first wall portion bears against the ceiling of the room;
   wherein the wall panels are engageable with adjacent wall panel(s); and
   wherein at least one toothed rack member is affixed along at least one side of the first wall portion and at least one corresponding meshing gear is mounted on the second wall portion.

6. The relocatable internal wall system of claim 5, wherein the at least one corresponding meshing gear is coupled to a rotatable shaft for urging the at least one rack member and the first wall portion from out of the void of the second wall portion to an extended position.

7. The relocatable internal wall system of claim 6, wherein the at least one corresponding meshing gear is configured for coupling to the shaft of a rotary hand tool or powered tool.

8. The relocatable internal wall system of claim 5, wherein the at least one corresponding meshing gear is configured for coupling to the shaft of a rotary hand tool or powered tool.

* * * * *